United States Patent
Santan et al.

(10) Patent No.: US 12,204,940 B2
(45) Date of Patent: Jan. 21, 2025

(54) TRANSPARENT AND REMOTE KERNEL EXECUTION IN A HETEROGENEOUS COMPUTING SYSTEM

(71) Applicant: Xilinx, Inc., San Jose, CA (US)

(72) Inventors: Sonal Santan, San Jose, CA (US); Yu Liu, Neward, CA (US); Yenpang Lin, Campbell, CA (US); Stephen P. Rozum, Loveland, CO (US)

(73) Assignee: Xilinx, Inc., San Jose, CA (US)

( * ) Notice: Subject to any disclaimer, the term of this patent is extended or adjusted under 35 U.S.C. 154(b) by 449 days.

(21) Appl. No.: 17/648,172

(22) Filed: Jan. 17, 2022

(65) Prior Publication Data
US 2023/0229497 A1 Jul. 20, 2023

(51) Int. Cl.
*G06F 9/50* (2006.01)
*G06F 9/30* (2018.01)
*G06F 9/54* (2006.01)
*G06F 12/02* (2006.01)

(52) U.S. Cl.
CPC ........ *G06F 9/5016* (2013.01); *G06F 9/30043* (2013.01); *G06F 9/544* (2013.01); *G06F 12/0238* (2013.01); *G06F 2212/7201* (2013.01)

(58) Field of Classification Search
CPC .... G06F 9/5016; G06F 9/30043; G06F 9/544; G06F 12/0238; G06F 2212/7201; G06F 2212/1016; G06F 12/08; G06F 12/10; G06F 9/545
See application file for complete search history.

(56) References Cited

U.S. PATENT DOCUMENTS

| | | | |
|---|---|---|---|
| 6,110,226 A * | 8/2000 | Bothner | G06F 9/45516 717/153 |
| 8,095,746 B1 * | 1/2012 | Wilt | G06F 12/0292 345/619 |
| 10,474,610 B1 | 11/2019 | Schelle et al. | |
| 10,481,814 B1 | 11/2019 | Nand et al. | |
| 10,489,543 B1 | 11/2019 | Lysaght et al. | |
| 10,635,769 B1 | 4/2020 | Skalicky et al. | |
| 10,725,942 B2 | 7/2020 | Thyamagondlu et al. | |
| 10,762,265 B1 | 9/2020 | Fang et al. | |
| 10,831,684 B1 * | 11/2020 | Kamran | G06F 3/0689 |
| 10,853,134 B2 | 12/2020 | Javre et al. | |
| 10,924,430 B2 | 2/2021 | Thyamagondlu et al. | |

(Continued)

*Primary Examiner* — Jorge A Chu Joy-Davila
(74) *Attorney, Agent, or Firm* — Kevin T. Cuenot

(57) ABSTRACT

Remote kernel execution in a heterogeneous computing system can include executing, using a device processor of a device communicatively linked to a host processor, a device runtime and receiving from the host processor within a hardware submission queue of the device, a command. The command requests execution of a software kernel and specifies a descriptor stored in a region of a memory of the device shared with the host processor. In response to receiving the command, the device runtime, as executed by the device processor, invokes a runner program associated with the software kernel. The runner program can map a physical address of the descriptor to a virtual memory address corresponding to the descriptor that is usable by the software kernel. The runner program can execute the software kernel. The software kernel can access data specified by the descriptor using the virtual memory address as provided by the runner program.

20 Claims, 7 Drawing Sheets

(56) References Cited

U.S. PATENT DOCUMENTS

| | | | |
|---|---|---|---|
| 10,977,018 B1 | 4/2021 | Hwang et al. | |
| 11,188,684 B2 | 11/2021 | Budde et al. | |
| 2012/0054877 A1* | 3/2012 | Rosu | G06F 9/45545 |
| | | | 726/30 |
| 2012/0151185 A1* | 6/2012 | Bybell | G06F 9/30189 |
| | | | 712/205 |
| 2013/0179486 A1* | 7/2013 | Lee | G06F 9/545 |
| | | | 709/201 |
| 2020/0201692 A1* | 6/2020 | Kachare | G06F 9/4806 |

* cited by examiner

800

Execute, using a device processor of a device communicatively linked to a host processor, a device runtime
802

Receive within a hardware submission queue of the device a command from the host processor, wherein the command requests execution of a software kernel and specifies a descriptor stored in a region of a memory of the device shared with the host processor
804

In response to receiving the command, the device runtime, as executed by the device processor, invokes a runner associated with the software kernel
806

Map, through execution of the runner program, a physical address of the descriptor to a virtual memory address corresponding to the descriptor that is usable by the software kernel
808

The runner program executes the software kernel, wherein the software kernel accesses data specified by the descriptor using the virtual memory address as provided by the runner
810

FIG. 8

TRANSPARENT AND REMOTE KERNEL EXECUTION IN A HETEROGENEOUS COMPUTING SYSTEM

TECHNICAL FIELD

This disclosure relates to heterogeneous computing systems and, more particularly, to remote execution of kernels within a heterogeneous computing system.

BACKGROUND

A heterogeneous computing system (HCS) refers to a type of data processing system that includes one or more host processors and one or more other processing devices. The host processor is typically implemented as a central processing unit (CPU) and may be disposed in a computer system such as a server. The host processor is coupled to the other processing devices through one or more communication channels. The other processing devices may be architecturally different from the host processor. The processing devices are capable of performing tasks offloaded from the host processor and making results of the tasks available to the host processor. Examples of these processing devices may include, but are not limited to, graphics processing unit(s) (GPUs) and digital signal processor(s) (DSPs).

SUMMARY

In one or more example implementations, a method can include executing, using a device processor of a device communicatively linked to a host processor, a device runtime. The method can include receiving within a hardware submission queue of the device a command from the host processor. The command requests execution of a software kernel and specifies a descriptor stored in a region of a memory of the device shared with the host processor. The method can include, in response to receiving the command, the device runtime, as executed by the device processor, invoking a runner program associated with the software kernel. The method can include mapping, through execution of the runner program, a physical address of the descriptor to a virtual memory address corresponding to the descriptor that is usable by the software kernel. The method also can include the runner program executing the software kernel. The software kernel accesses data specified by the descriptor using the virtual memory address as provided by the runner program.

In one or more example implementations, a system can include a hardware submission queue configured to receive a command from a host processor. The command specifies a software kernel and a descriptor stored in a region of a memory shared with the host processor. The system can include a device processor configured to execute a device runtime. The system can include a submission doorbell circuit configured to receive a notification of the command and, in response to receiving the notification, generate an interrupt to the device processor. The device runtime, as executed by the device processor, is capable of invoking a runner program in response to the interrupt. The runner program is configured to map a physical address of the descriptor to a virtual memory address corresponding to the descriptor that is usable by the software kernel. The runner program executes the software kernel. The software kernel is capable of accessing the data specified by the descriptor using the virtual memory address as provided by the runner program.

In one or more example implementations, a system can include a hardware submission queue configured to receive a command from a host processor. The command specifies a software kernel and a descriptor stored in a region of a memory shared with the host processor. The system can include a device processor configured to execute a device runtime. The system can include a network interface controller configured to receive the command from the host processor and store the command within the hardware submission queue. The descriptor is stored in the region of the memory shared with the host processor by the network interface controller using remote direct memory access. The device runtime, as executed by the device processor, is capable of invoking a runner program in response to detecting the command in the hardware submission queue. The runner program is configured to map a physical address of the descriptor to a virtual memory address corresponding to the descriptor that is usable by the software kernel. The runner program can execute the software kernel. The software kernel is capable of accessing the data specified by the descriptor using the virtual memory address as provided by the runner program.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 8 is an example method illustrating certain operative features of the IC of the HCS of FIG. 1.

DETAILED DESCRIPTION

Figure 1:
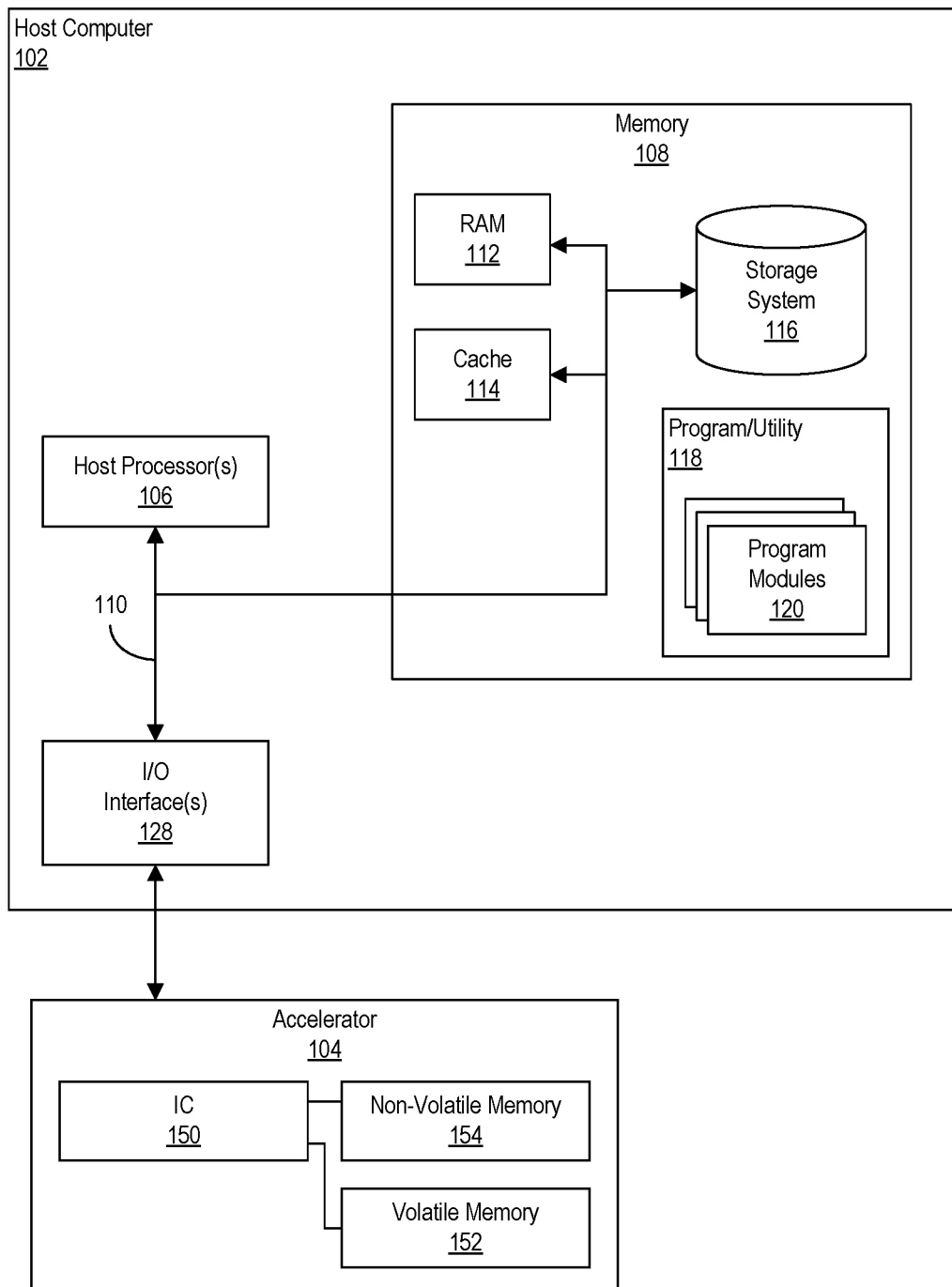
FIG. 1 illustrates an example of a heterogeneous computing system (HCS) in accordance with the inventive arrangements described herein.

This disclosure relates to heterogeneous computing systems (HCSs) and, more particularly, to remote execution of kernels within an HCS. An HCS includes a host system communicatively linked with one or more other devices capable of performing tasks offloaded from a host processor of the host system. The one or more devices are capable of implementing one or more kernels that perform the tasks as offloaded from the host processor.

The term "kernel" refers to a data processing element. The kernel may be a user-specified (e.g., custom) data processing element or a data processing element obtained from a standard library of kernels. The kernel may implement any of a variety of different functions including commonly used functions. These functions may be specific to a particular domain such as image processing, communications, cryptography, or the like. A software kernel is a kernel that is implemented as executable program code and may be executed by a processor. A hardware kernel is a kernel that is implemented, at least partially, in circuitry. A hardware kernel is characterized by the inclusion of hardware configuration data targeted to the particular circuitry in which the hardware kernel will be implemented. The hardware configuration data configures some aspect of the circuitry. For example, a hardware kernel may be realized as a circuit implemented using programmable logic and/or as a hardwired circuit block by way of loading the hardware configuration data into configuration memory and/or control registers of the device. In other cases, e.g., a processor array, a hardware kernel may include hardware configuration data (used to configure certain aspects of the processor array) paired with one or more precompiled portions of executable program code that execute on one or more of the processors of the processor array.

In one or more example implementations, a device of the HCS implements a hardware architecture that includes a processor, referred to herein as a "device processor," capable of executing program code. The device processor is capable of executing a software architecture that provides the device processor with a variety of capabilities that extend beyond simply compute (e.g., performing graphics processing operations and/or performing floating point operations). Unlike other hardware acceleration platforms where the device, e.g., a graphics processing unit (GPU), operates with the limited role of performing limited compute functions, the software platform provides the device with the capability of executing one or more software kernels using the device processor upon request from the host processor. The software kernels are capable of interacting with the software architecture executing in the device by way of an application programming interface (API) to perform further operations and/or functions. Through interaction with the software architecture, the software kernel(s) are endowed with greater capabilities. For example, the software kernel(s) are capable of invoking other kernels (e.g., whether software or hardware), controlling execution of the other kernels as invoked, and/or implementing more complex workflows that may involve one or more communicatively linked kernels and/or device input/output (I/O) functions. Further aspects of the inventive arrangements are described below with reference to the figures.

FIG. 1 illustrates an example of an HCS 100 in accordance with the inventive arrangements described herein. HCS 100 may include a data processing system, e.g., host computer 102, and an accelerator 104. As defined herein, "data processing system" means one or more hardware systems configured to process data, each hardware system including at least one processor programmed to initiate operations and memory. An example of a data processing system is a server.

Host computer 102 can include one or more host processors 106, a memory 108, and a bus 110 that couples various system components including memory 108 to host processor 106. Host processor 106 may be implemented as one or more processors. In an example, host processor 106 is implemented as a central processing unit (CPU). As defined herein, the term "processor" means at least one circuit capable of carrying out instructions contained in program code. The circuit may be an integrated circuit or embedded in an integrated circuit. Host processor 106 may be implemented using a complex instruction set computer architecture (CISC), a reduced instruction set computer architecture (RISC), a vector processing architecture, or other known architecture. Example processors include, but are not limited to, processors having an x86 type of architecture (IA-32, IA-64, etc.), Power Architecture, ARM processors, and the like.

Bus 110 represents one or more of any of a variety of communication bus structures. By way of example, and not limitation, bus 110 may be implemented as a Peripheral Component Interconnect Express (PCIe) bus. Host computer 102 typically includes a variety of computer system readable media. Such media may include computer-readable volatile and non-volatile media and computer-readable removable and non-removable media.

Memory 108 can include computer-readable media in the form of volatile memory, such as random-access memory (RAM) 112 and/or cache memory 114. Host computer 102 also can include other removable/non-removable, volatile/non-volatile computer storage media. By way of example, storage system 116 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. Memory 108 is an example of at least one computer program product.

Program/utility 118, having a set (at least one) of program modules 120, may be stored in memory 108. Program/utility 118 is executable by processor 106. By way of example, program modules 120 may represent an operating system, one or more application programs, other program modules, and program data. Program modules 120, upon execution, cause host computer 102, e.g., host processor 106, to carry out the functions and/or methodologies of the example implementations described within this disclosure. Program/utility 118 and any data items used, generated, and/or operated upon by host processor 106 are functional data structures that impart functionality when employed by host computer 102. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 128 communicatively linked to bus 110. I/O interface(s) 128 allow host computer 102 to communicate with one or more external devices such as accelerator 104. I/O interfaces 128 may communicate over any of a variety of different types of communication channels such as Ethernet, PCIe, or other types of communication channels established over a local area network (LAN), a wide area network (WAN), or a public network (e.g., the Internet).

Examples of I/O interfaces 128 may include, but are not limited to, network cards, modems, network adapters, hardware controllers, etc. Examples of external devices also may include devices that allow a user to interact with host computer 102 (e.g., a display, a keyboard, and/or a pointing device).

In an example implementation, the I/O interface 128 through which host computer 102 communicates with accelerator 104 is a PCIe adapter. In that case, the communication channel linking host computer 102 and accelerator 104 may be a PCIe communication channel. In another example, I/O interface 128 may be implemented as a network interface controller (NIC). In that case, the communication channel linking host computer 102 and accelerator 104 may be Ethernet.

Host computer 102 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Host computer 102 may be operational with numerous other general-purpose or special-purpose computing system environments or configurations. Examples of computing systems, environments, and/or configurations that may be suitable for use with host computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Accelerator 104 may be implemented as a circuit board that couples to host computer 102. Accelerator 104 may, for example, be inserted into a card slot, e.g., an available bus and/or PCIe slot, of host computer 102. Accelerator 104 includes IC 150. Accelerator 104 also includes volatile memory 152 coupled to IC 150 and a non-volatile memory 154 also coupled to IC 150. Volatile memory 152 may be implemented as a RAM. In the example of FIG. 1, volatile memory 152 is external to IC 150. In other examples, volatile memory 152 may be included in IC 150. In still other examples, some volatile memory may be included in IC 150 while other volatile memory is external to IC 150 and disposed on accelerator 104. In any case, volatile memory 152 is considered local memory for IC 150. By comparison, memory 108 is considered local to host computer 102 and host processor 106. Non-volatile memory 154 may be implemented as flash memory. Non-volatile memory 154 is also external to IC 150 and may be considered local to IC 150.

IC 150 includes one or more processors capable of executing program code. In one aspect, IC 150 may also include programmable circuitry that is configurable to implement user-specified digital circuits. Programmable logic is an example of programmable circuitry. IC 150 may be implemented as an application specific IC (ASIC), a System-on-Chip (SoC), or other type of IC that includes at least one processor capable of executing program code and optionally one or more additional subsystems.

The example of FIG. 1 is not intended to suggest any limitation as to the scope of use or functionality of example implementations described herein. HCS 100 is an example of computer hardware that is capable of performing the various operations described within this disclosure. In this regard, HCS 100 may include fewer components than shown or additional components not illustrated in FIG. 1 depending upon the particular type of system that is implemented. The particular operating system and/or application(s) included may vary according to system type as may the types of I/O devices included. Further, one or more of the illustrative components may be incorporated into, or otherwise form a portion of, another component. For example, a processor may include at least some memory.

Some computing environments, e.g., cloud computing environments and/or edge computing environments using HCS 100 generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Figure 2:
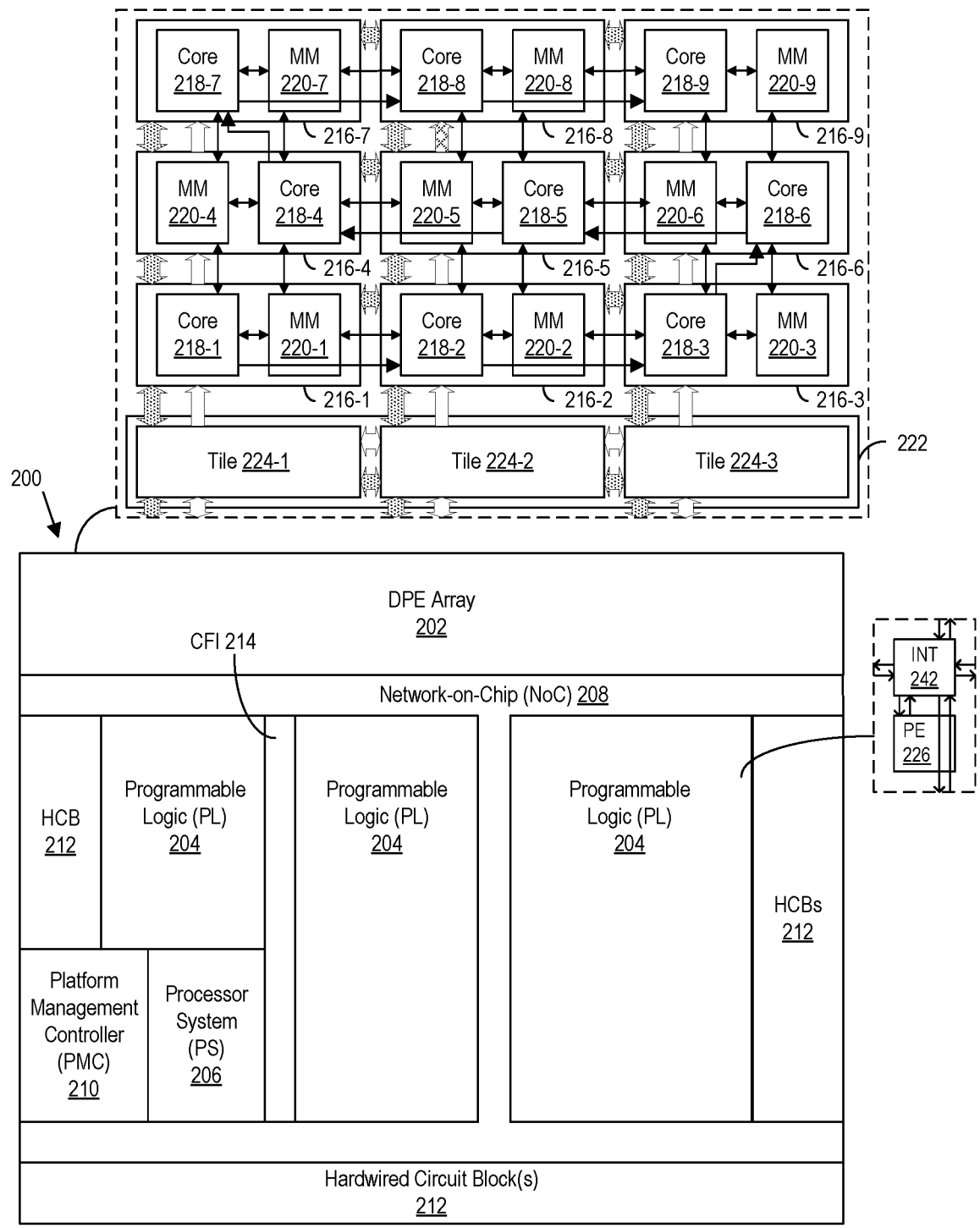
FIG. 2 illustrates an example architecture for an integrated circuit (IC) that may be used within an HCS.

FIG. 2 illustrates an example architecture for an IC 200. IC 200 is an example of a programmable IC and an adaptive system. In one aspect, IC 200 is also an example of a System-on-Chip (SoC). In the example of FIG. 2, IC 200 is implemented on a single die provided within a single integrated package. In other examples, IC 200 may be implemented using a plurality of interconnected dies where the various programmable circuit resources illustrated in FIG. 2 are implemented across the different interconnected dies. IC 200 is an example of a device that may be included as IC 150 of accelerator 104 of FIG. 1.

In the example, IC 200 includes a data processing engine (DPE) array 202, programmable logic (PL) 204, a processor system (PS) 206, a Network-on-Chip (NoC) 208, a platform management controller (PMC) 210, and one or more hardwired circuit blocks 212. A configuration frame interface (CFI) 214 also may be included. It should be appreciated that the architecture of IC 200 is provided for purposes of illustration and not limitation. An IC for use with the inventive arrangements described herein may include any of a variety of combinations of the subsystems described herein. For example, an IC such as IC 150 may include one or more processors. In another example, an IC such as IC 150 may include one or more processors (e.g., PS 206) in combination with PL 204. In another example, an IC such as IC 150 may include one or more processors (e.g., PS 206) in combination with a processor array such as DPE array 202.

DPE array 202 is implemented as a plurality of interconnected and programmable DPEs 216. DPEs 216 may be arranged in an array and are hardwired. Each DPE 216 can include one or more cores 218 and a memory module (abbreviated "MM" in FIG. 2) 220. In one aspect, each core 218 is capable of executing program code stored in a core-specific program memory contained within each respective core (not shown). Each core 218 is capable of directly accessing the memory module 220 within the same DPE 216 and the memory module 220 of any other DPE 216 that is adjacent to the core 218 of the DPE 216 in the up, down, left, and/or right directions. For example, core 218-5 is capable of directly reading and/or writing (e.g., via respective memory interfaces not shown) memory modules 220-5, 220-8, 220-6, and 220-2. Core 218-5 sees each of memory modules 220-5, 220-8, 220-6, and 220-2 as a unified region of memory (e.g., as a part of the local memory accessible to core 218-5). This facilitates data sharing among different DPEs 216 in DPE array 202. In other examples, core 218-5 may be directly connected to memory modules 220 in other DPEs.

DPEs 216 are interconnected by programmable DPE interconnect circuitry. The programmable DPE interconnect circuitry may include one or more different and independent networks. For example, the programmable DPE interconnect circuitry may include a streaming network formed of streaming connections (shaded arrows) implemented using a plurality of interconnected stream switches and a memory mapped network formed of memory mapped connections (unshaded arrows).

Loading configuration data into control registers of DPEs 216 by way of the memory mapped connections allows each DPE 216 and the components therein to be controlled independently. DPEs 216 may be enabled/disabled on a per-DPE basis. Each core 218, for example, may be configured to access the memory modules 220 as described to facilitate communication among DPEs through shared memory modules 220 or only a subset of memory modules 220 to achieve isolation of a core 218 or a plurality of cores 218 operating as a cluster. Each streaming connection may be configured to establish logical connections between only selected ones of DPEs 216 to achieve isolation of a DPE 216 or a plurality of DPEs 216 operating as a cluster. Because each core 218 may be loaded with program code specific to that core 218, each DPE 216 is capable of implementing one or more different kernels therein.

In other aspects, the programmable DPE interconnect circuitry within DPE array 202 may include additional independent networks such as a debug network and/or an event broadcast network, each being independent (e.g., distinct and separate from) the streaming connections and the memory mapped connections. In some aspects, the debug network is formed of memory mapped connections and/or is part of the memory mapped network.

Cores 218 may be directly connected with adjacent cores 218 via core-to-core cascade connections. In one aspect, core-to-core cascade connections are unidirectional and direct connections between cores 218 as pictured. In another aspect, core-to-core cascade connections are bidirectional and direct connections between cores 218. In general, core-to-core cascade connections generally allow the results stored in an accumulation register of a source core to be provided directly to an input of a target or load core. Activation of core-to-core cascade interfaces may also be controlled by loading configuration data into control registers of the respective DPEs 216.

In an example implementation, DPEs 216 do not include cache memories. By omitting cache memories, DPE array 202 is capable of achieving predictable, e.g., deterministic, performance. Further, significant processing overhead is avoided since maintaining coherency among cache memories located in different DPEs 216 is not required. In a further example, cores 218 do not have input interrupts. Thus, cores 218 are capable of operating uninterrupted. Omitting input interrupts to cores 218 also allows DPE array 202 to achieve predictable, e.g., deterministic, performance.

SoC interface block 222 operates as an interface that connects DPEs 216 to other resources of IC 200. In the example of FIG. 2, SoC interface block 222 includes a plurality of interconnected tiles 224 organized in a row. In particular embodiments, different architectures may be used to implement tiles 224 within SoC interface block 222 where each different tile architecture supports communication with different resources of IC 200. Tiles 224 are connected so that data may be propagated from one tile to another bi-directionally. Each tile 224 is capable of operating as an interface for the column of DPEs 216 directly above and is capable of interfacing such DPEs 216 with components and/or subsystems of IC 200 including, but not limited to, PL 204 and/or NoC 208.

Tiles 224 are connected to adjacent tiles, to DPEs 216 immediately above, and to circuitry below using the streaming connections and the memory mapped connections as shown. Tiles 224 may also include a debug network that connects to the debug network implemented in DPE array 202. Each tile 224 is capable of receiving data from another source such as PS 206, PL 204, and/or another hardwired circuit block 212. Tile 224-1, for example, is capable of providing those portions of the data, whether application or configuration, addressed to DPEs 216 in the column above to such DPEs 216 while sending data addressed to DPEs 216 in other columns on to other tiles 224, e.g., 224-2 or 224-3, so that such tiles 224 may route the data addressed to DPEs 216 in their respective columns accordingly.

PL 204 is circuitry that may be programmed to perform specified functions. As an example, PL 204 may be implemented as field programmable gate array type of circuitry. PL 204 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 204 is highly configurable unlike hardwired circuitry. Each programmable circuit block of PL 204 typically includes a programmable element 226 (e.g., a functional element) and a programmable interconnect 242. The programmable interconnects 242 provide the highly configurable topology of PL 204. The programmable interconnects 242 may be configured on a per wire basis to provide connectivity among the programmable elements 226 of programmable circuit blocks of PL 204 and is configurable on a per-bit basis (e.g., where each wire conveys a single bit of information) unlike connectivity among DPEs 216, for example, that may include multi-bit stream connections capable of supporting packet-based communications. As noted, hardware kernels may be implemented in DPE array 202 and/or in PL 204.

PS 206 is implemented as hardwired circuitry that is fabricated as part of IC 200. PS 206 may be implemented as, or include, any of a variety of different processor types each capable of executing program code. For example, PS 206 may be implemented as one or more processors. Each processor may include one or more cores. Each processor and/or core is capable of executing program code. In still another example, PS 206 may include one or more processors, cores, modules, co-processors, I/O interfaces, and/or other resources. PS 206 may be implemented using any of a variety of different types of architectures. Example architectures that may be used to implement processors and/or cores of PS 206 may include, but are not limited to, a CISC architecture, a RISC architecture, a vector processing architecture, or other known architecture. Example processors include, but are not limited to, processors having an x86 type of architecture (IA-32, IA-64, etc.), Power Architecture, ARM processors, and the like. In one or more example implementations, PS 206 may execute a control program, e.g., a software kernel, that controls execution of an application (e.g., one or more kernels) within DPE array 202 and/or one or more kernels implemented in PL 204.

NoC 208 is a programmable interconnecting network for sharing data between endpoint circuits in IC 200. The endpoint circuits can be disposed in DPE array 202, PL 204, PS 206, and/or selected hardwired circuit blocks 212. NoC 208 can include high-speed data paths with dedicated switching. In an example, NoC 208 includes one or more horizontal paths, one or more vertical paths, or both horizontal and vertical path(s). The arrangement and number of regions shown in FIG. 2 is merely an example. NoC 208 is an example of the common infrastructure that is available within IC 200 to connect selected components and/or subsystems.

Within NoC 208, the nets that are to be routed through NoC 208 are unknown until a user circuit design is created for implementation within IC 200. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of IC 200 (e.g., is hardwired) and, while not physically modifiable, may be programmed to establish connectivity between different master circuits and different slave circuits of a user circuit design. NoC 208, upon power-on, does not implement any application data paths or routes therein, but may provide default paths for loading configuration data into selected other subsystems. Once configured by PMC 210, however, NoC 208 implements data paths or routes between endpoint circuits.

PMC 210 is responsible for managing IC 200. PMC 210 is a subsystem within IC 200 that is capable of managing the other programmable circuit resources across the entirety of IC 200. PMC 210 is capable of maintaining a safe and secure environment, booting IC 200, and managing IC 200 during normal operations. For example, PMC 210 is capable of providing unified and programmable control over power-up, boot/configuration, security, power management, safety monitoring, debugging, and/or error handling for the different programmable circuit resources of IC 200 (e.g., DPE array 202, PL 204, PS 206, and NoC 208). PMC 210 operates as a dedicated platform manager that decouples PS 206 and from PL 204. As such, PS 206 and PL 204 may be managed, configured, and/or powered on and/or off independently of one another.

In another example, PMC 210 may be omitted from IC 200. In that case, one of the processors of PS 206 may be designated to perform the functions and/or operations attributed to PMC 210.

Hardwired circuit blocks 212 include special-purpose circuit blocks fabricated as part of IC 200. Though hardwired, hardwired circuit blocks 212 may be configured by loading configuration data into control registers to implement one or more different modes of operation. Examples of hardwired circuit blocks 212 may include input/output (I/O) blocks, transceivers for sending and receiving signals to circuits and/or systems external to IC 200, memory controllers, or the like. Examples of different I/O blocks may include single-ended and pseudo differential I/Os. Examples of transceivers may include high-speed differentially clocked transceivers. Other examples of hardwired circuit blocks 212 include, but are not limited to, cryptographic engines, digital-to-analog converters (DACs), analog-to-digital converters (ADCs), and the like. In general, hardwired circuit blocks 212 are application-specific circuit blocks.

In one or more other examples, hardwired circuit blocks 212 may include a RAM, e.g., one or more banks of RAM. As an example, the RAM may be a Double Data Rate (DDR) Synchronous Dynamic RAM. In still another example, hardware circuit blocks 212 may include a High-Bandwidth Memory (HBM).

CFI 214 is an interface through which configuration data, e.g., a configuration bitstream, may be provided to PL 204 to implement different user-specified circuits and/or circuitry therein. CFI 214 is coupled to and accessible by PMC 210 to provide configuration data to PL 204. In some cases, PMC 210 is capable of first configuring PS 206 such that PS 206, once configured by PMC 210, may provide configuration data to PL 204 via CFI 214.

The various programmable circuit resources illustrated in FIG. 2 may be programmed initially as part of a boot process for IC 200. During runtime, the programmable circuit resources may be reconfigured. In one aspect, PMC 210 is capable of initially configuring DPE array 202, PL 204, PS 206, and NoC 208. At any point during runtime, PMC 210 may reconfigure all or a portion of IC 200. In some cases, PS 206 may configure and/or reconfigure PL 204 and/or NoC 208 once initially configured by PMC 210.

Figure 3:
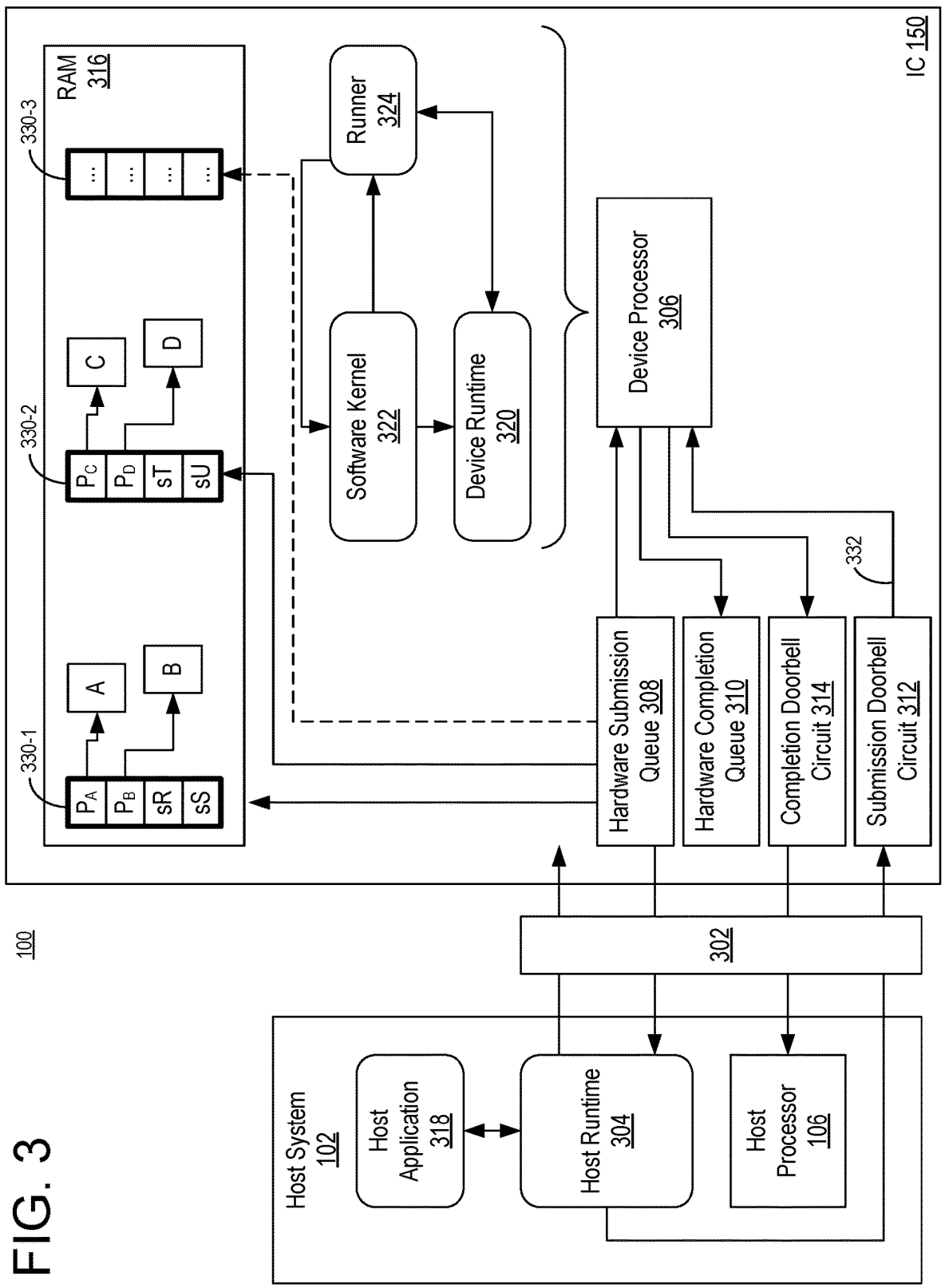
FIG. 3 is another example implementation of an HCS in accordance with the inventive arrangements described herein.

FIG. 3 is another example implementation of HCS 100 in accordance with the inventive arrangements described herein. In the example of FIG. 3, host system 102 and IC 150 are communicatively linked by communication channel 302. Communication channel 302 may be a PCIe channel. Host system 102 includes a host runtime 304, which is implemented as program code stored in memory. Host runtime 304 is executable by host processor 106. Host system 102 also includes a host application 318, which is implemented as program code stored in memory and which is executable by host processor 106.

IC 150 includes a hardware architecture that includes a processor 306 referred to herein as a "device processor" to differentiate processor 306 from host processor 106, a hardware submission queue 308, a hardware completion queue 310, a submission doorbell circuit 312, a completion doorbell circuit 314, and a RAM 316. Device processor 320 may be implemented as an embedded processor within IC 150. In one aspect, device processor 320 may be a designated processor of PS 206 of FIG. 2. In the example of FIG. 3, RAM 316 is disposed within IC 150. As discussed, in other examples, RAM 316 may be external to IC 150 and disposed on accelerator 104.

IC 150 further includes a software architecture executable by device processor 306. The software architecture includes a device runtime 320, one or more software kernels such as software kernel 322, and one or more runners such as runner 324. Each of device runtime 320, software kernel 322, and runner 324 is implemented as program code that may be stored in memory, e.g., RAM 316, and executed by device processor 306.

The software and hardware architecture of IC 150 allows host system 102 to offload tasks to IC 150 to be performed by one or more kernels implemented therein. Host system 102, in executing host runtime 304, is capable of invoking the kernels remotely. The kernels may be implemented as software kernels that are executable by a processor in IC 150 such as device processor 306 and/or or hardware kernels that may be implemented in other subsystems of IC 150 (e.g., DPE array 202 and/or PL 204). In executing a software kernel using device processor 306, the software architecture provides increased flexibility in that the software kernel executes over an operating system executed by device processor 306 and device runtime 320 also executed by device processor 306. In this regard, host application 318 and software kernel 322 both may be implemented in a high-level programming language such as C/C++. Software kernel 322 is capable of accessing a rich set of APIs provided by device runtime 320.

The term "runtime," in reference to host runtime 304 and device runtime 320 refers to a collection of software programs used at program run time to provide one or more native program functions or services. Host runtime 304 is capable of providing one or more program functions or services to host application 318. Device runtime 320 is capable of providing one or more program functions or services to software kernel 322. The runtimes enable software programs to be executed with increased functionality and scope by providing add-on program resources that may be used by the software programs, e.g., user software programs in this example. In the examples described herein, the host runtime 304 and the device runtime 308 facilitate the offloading of tasks from host system to software kernel 322.

By comparison, a GPU accelerator environment provides a hardware-centric computing architecture that is tailored to particular operations typically in the domain of graphics processing. The GPU receives data, operates on that data according to a predetermined set of functions, and provides the data back to the host system. The GPU, for example, is unable to access an API provided by an embedded processor or coordinate operations of other kernels (e.g., other GPUs) within the same device or another device. The software architecture illustrated in the example of FIG. 3 allows software kernel 322 to perform such operations. Further, the software architecture provides for transparent buffer mapping between host system 102 and IC 150 that standardizes the transfer of data between host system 102 and IC 150.

In the example of FIG. 3, a user may develop host application 318 and software kernel 322. Host application 318 is a user application, e.g., program code, that is compiled to execute on host processor 106. Host application 318 may invoke, by way of host runtime 304, software kernel 322. Software kernel 322 also may be user program code compiled to execute on device processor 306 of IC 150. In general, host application 318 executes in host system 102 in coordination with host runtime 304. Similarly, software kernel 322 executes in IC 150 in coordination with device runtime 320. Host runtime 304 is considered system software. Similarly, device runtime 320 is considered system software for IC 150. That is host runtime 304 and device runtime 320 are not user-developed or user-provided program code.

Though not shown, IC 150 may execute an operating system. That is, device processor 306 may execute an operating system (e.g., LINUX) on which device runtime 320 executes. The operating system may be stored in an area of memory, e.g., in a region of RAM 316, that is protected so that only device processor 306 is able to access the region of memory and the operating system stored therein. Device runtime 320 also may be stored in this protected area of memory with the operating system.

In one example, software kernel 322 is compiled into a shared object file. A shared object file (e.g., a shared object library or shared library), may be executed within the LINUX operating system. A shared object file is a file that can be linked to any program at run-time. Once loaded, the shared object file can be used by any number of programs. In another analogous example, software kernel 322 may be compiled into a Dynamic Link Library (DLL) in an example where device processor 306 executes a WINDOWS type of operating system.

As IC 150 undergoes a startup or boot process, IC 150 is configured for operation. The operating system is loaded into RAM 316 and executed and device runtime 320 is loaded into RAM 316 and executed. As noted, the operating system and device runtime 320 may be loaded from non-volatile memory 154 into a secure partition of RAM 316 that is only available to device processor 306. The secure partition, for example, is not visible or accessible by the host system 102.

Device runtime 320 is capable of creating a runner for each software kernel and/or instance of a software kernel included or executed in IC 150. In general, for each software kernel included in IC 150, the software kernel will have a corresponding runner that is executed by device runtime 320. Each runner may be executed in a different thread of device processor 306. Upon execution, e.g., at or about the time of startup, each runner loads the corresponding software kernel or instance thereof in the memory allocated to the respective runner. For example, runner 324 is executed by device runtime 320 at startup and loads software kernel 322 into the memory allocated to runner 324 (e.g., a portion of RAM 316 that is allocated to runner 324). Once software kernel 322 is loaded in memory as described, software kernel 322 is available for execution by device processor 306.

In the example of FIG. 3, host application 318, interacts with host runtime 304, to write one or more descriptors 330 to shared memory of IC 150, e.g., to RAM 316. In addition, host application 318 is capable of writing one or more commands to hardware submission queue 308. Each command may include a pointer to a descriptor 330 and may include an indication of, or specify, the particular software kernel requested for execution (e.g., specify software kernel 322 or another, different software kernel).

In one or more example implementations, hardware submission queue 308, hardware completion queue 310, and the area of memory monitored by submission doorbell circuit 312 may be implemented in a region of memory shared with host system 102. The region of memory shared with host system 102 may be located in RAM 316. Thus, though the hardware submission queue 308, hardware completion queue 310, and the area of memory monitored by submission doorbell circuit 312 are depicted outside of RAM 316, such structures may be implemented in or using RAM 316. As noted, RAM 316 may be an internal memory or an external memory of IC 150. Thus, in one or more example implementations, host system 102 communicates with IC 150 by way of such queues by sending commands as opposed to accessing any internal registers of IC 150.

The writing of a command to hardware submission queue 308 also causes host runtime 304 to send a message to submission doorbell circuit 312, which initiates an interrupt 332 to device processor 306. In response to the interrupt 332, device processor 306, in executing device runtime 320, retrieves the command from the hardware submission queue 308. Device runtime 320, for example, is capable of parsing the command to determine the descriptor (e.g., the address of the descriptor) in shared memory to which the command refers or points and the identity of the software kernel being requested for execution to process the data of descriptor 330.

Having identified the particular software kernel to be executed, e.g., software kernel 322, device runtime 320 calls or invokes the runner corresponding to the determined software kernel, e.g., runner 324. Runner 324, having already loaded software kernel 322 into memory, is capable of executing software kernel 322 and passing the address of the descriptor to be operated on to software kernel 322. In one aspect, runner 324 is configured to perform one or more mapping operations to make the descriptor available to, or accessible by, software kernel 322.

Consider an example where the command specifies software kernel 322 and descriptor 330-1. Descriptor 330-1 includes a pointer ($P_A$) to an array A, a pointer ($P_B$) to an array B, and scalar values R and S. In one aspect, runner 324 is capable of mapping the physical addresses of descriptor 330-1 in shared memory to virtual addresses that are understandable by software kernel 322. The mapping operations performed by runners may be hidden from view of users. That is, the mapping may occur automatically and without user (e.g., user application) intervention or awareness.

In the example of descriptor 330-1, for example, runner 324 is capable of parsing the descriptor 330-1 and mapping the buffer pointers $P_A$ and $P_B$ to the user's memory space (e.g., generate the virtual addresses corresponding to pointers $P_A$ and $P_B$ that are understandable by software kernel 322). Runner 324, for example, may generate a call frame, e.g., a data structure, including the pointers as mapped or translated to virtual memory addresses and the scalar arguments. Runner 324 may then call software kernel 322, pass the generated call frame to software kernel 322, and then wait for the call to return.

In another aspect, runner 324 may perform additional buffer processing. For example, runner 324 is capable of ensuring that any data referenced by a buffer pointer in descriptor 330-1 is stored locally in shared memory (e.g., RAM 316). For example, runner 324 is capable of checking whether array A and/or array B are stored locally in RAM 316. In response to determining that one or both of the arrays is/are not stored in RAM 316 (e.g., the pointers to the arrays point to remote memories), runner 324 is capable of fetching such data and storing the data within the shared memory. Runner 324 may map the pointers, as included in the call frame, to the location in RAM 316 where the buffer(s) have been stored once retrieved from the remote memory.

In performing the mapping functions described herein, runner 324 is only capable of, or permitted to, map addresses within the region of memory that is reserved for use by kernels of IC 150, whether such kernels are software kernels or hardware kernels.

In one aspect, software kernel 322 is capable of executing without any root privileges. As such, software kernel 322 is not capable of directly accessing hardware of IC 150. Rather, software kernel 322 may have selective access to device nodes of the operating system based on an initial configuration of IC 150. Runner 324 is capable of executing, or invoking, the requested software kernel. The requested software kernel may execute inside of a container, to be distinguished from a container file, such that resource usage by the software kernel, e.g., device processor 306 cycles, memory usage, filesystem access, and access to nodes of IC 150, is constrained.

Upon execution, software kernel 322 is capable of performing any of a variety of different operations. In one or more examples, software kernel 322 is capable of performing one or more edge device functions. In general, an edge device is any piece of hardware that controls data flow at a boundary between two networks. An edge device may fulfill a variety of roles, depending on the type of device. In general, however, the edge device may operate as a network entry or exit point. Functions that software kernel 322, operating in an edge device capacity, may perform include, but are not limited to, transmission, routing, processing, monitoring, filtering, translation, and storage of data passing between networks.

Upon completion of execution of software kernel 322, the function may return to runner 324, which is capable of notifying device runtime 320 that software kernel 322 completed execution. Device runtime 320 is capable of storing an indication that software kernel 322 completed execution in hardware completion queue 310. The indication may include a reference or pointer to a location in shared memory, e.g., RAM 316, where results from execution of software kernel 322 are stored. Device runtime 320 also triggers operation of completion doorbell circuit 314. Completion doorbell circuit 314 sends an interrupt to host processor 106 indicating the availability of the indicator in hardware completion queue 310. Host processor 106 is capable of fetching the indicator from hardware completion queue 310 in response to the interrupt and fetching the results stored at the location specified by the indicator.

In the example of FIG. 3, the host runtime 304 and the device runtime 320 provide functionality for exchanging data between the host system 102 and IC 150. In addition, the software kernel 322 is capable of interacting with other systems by accessing the API provided by device runtime 320. The ability to access an API of device runtime 320 by software kernel 322 means that software kernel 322 is capable of performing a variety of additional operations and/or tasks beyond compute. The software kernel 322 is capable of performing compute operations in addition to initiating other kernels that may be implemented within other subsystems and/or hardwired circuit blocks and/or managing operations performed by such other kernels and/or hardwired circuit blocks within IC 150. This capability extends beyond the "compute only" model typically utilized by GPUs.

As an illustrative and non-limiting example, software kernel 322 may be configured to perform image processing operations and/or interact with one or more other kernels within IC 150 and/or hardwired circuit blocks within IC 150. Software kernel 322, for example, may read data from an HDMI input of IC 150, process the data by performing one or more operations, and send the processed data to one or more other kernels or a group of kernels. The kernel(s) may be hardware kernels realized using a hardened GPU implemented in IC 150 as a hardwired circuit block 212 or realized in the DPE array 202 within IC 150. In this example, the referenced hardwired circuit block is also referred to as a hardware kernel. A first set of one or more hardware kernels may perform machine learning-based inferencing. The resulting data from the first set of one or more hardware kernels may be provided to a second set of one or more hardware kernels capable of displaying the generated data on a display device or screen. The operation of the various hardware kernels, whether the hardwired circuit blocks and/or the hardware kernels of the first and/or second set, may be managed or controlled by software kernel 322. That is, software kernel 322 may control the flow of data among the hardware kernels and invoke the hardware kernels.

In one or more example implementations, the software kernel 322 provides an interface between host system 102 and the other hardware of IC 150. For example, particular subsystems of IC 150, e.g., DPE array 202, PL 204, PS 206, and the like may not be directly accessible or visible by host system 102. Host system 102 may be restricted from accessing (e.g., reading and/or writing) to control registers of IC 150 to directly access such other subsystems. In order to effectuate processing in IC 150, such as through the DPE array 202, PL 204, and/or hardwired circuit blocks 212, host system 102 may invoke software kernel 322, which then initiates and controls execution of other kernels in DPE array 202, PL 204, and/or hardwired circuit blocks. In this regard, host system 102 is able to control operation of kernels implemented in DPE array 202, PL 204, and/or hardwired circuit blocks 212 only through interaction with, e.g., by sending supported commands, to software kernel 322.

The example architecture described in the example of FIG. 3 allows the software kernel to perform functions beyond compute that may include, but are not limited to, video processing including coordinating operation of multiple other video processing kernels and/or other compute kernels, performing device management functions (IC 150 management functions and/or IC 150 I/O functions), performing networking and storage acceleration, and/or abstracting away the particular type of communication channel used to communicatively link the host system 102 with the IC 150.

Though not illustrated in the example of FIG. 3, device processor 306 may execute multiple instances of software kernel 322. In executing multiple instances of software kernel 322, each instance may execute in a different thread of execution that is spawned by a runner for that instance. That is, each instance will have a corresponding runner. Using multiple instances of software kernel 322 and multiple threads of execution leads to simpler design with higher throughput and improved isolation between the software kernels (e.g., instances).

Figure 4:
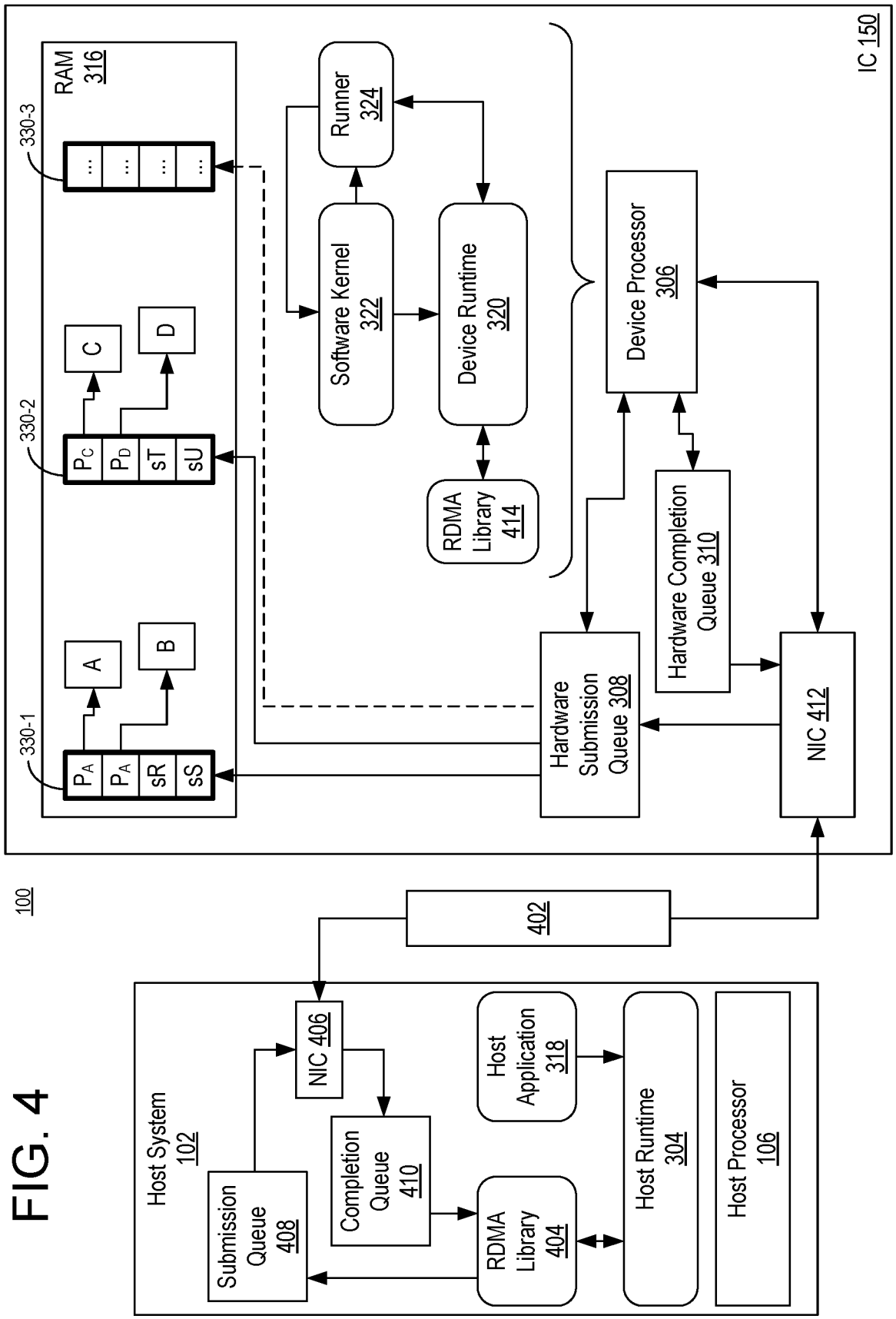
FIG. 4 is another example implementation of an HCS in accordance with the inventive arrangements described herein.

FIG. 4 is another example implementation of HCS 100 in accordance with the inventive arrangements described herein. In the example of FIG. 4, host system 102 and IC 150 are communicatively linked by communication channel 402. Communication channel 402 may be an Ethernet communication channel (e.g., a communication established over an Ethernet network). Host system 102 includes host runtime 304, which is implemented as program code stored in memory. Host runtime 304 is executable by host processor 106. Host system 102 also includes host application 318 and a Remote Direct Memory Access (RDMA) library 404, which are implemented as program code stored in memory and which are executable by host processor 106. Host system 102 includes a NIC 406, a submission queue 408, and a completion queue 410.

IC 150 includes a hardware architecture that includes device processor 306, hardware submission queue 308, hardware completion queue 310, RAM 316, and a NIC 412. Device processor 320 may be implemented as an embedded processor within IC 150 or as a processor that is included as part of the PS 206 of FIG. 2. In the example of FIG. 4, RAM 316 is disposed within IC 150. As discussed, in other examples, RAM 316 may be external to IC 150 and disposed on accelerator 104.

IC 150 further includes a software architecture that is executable by device processor 306. The software architecture includes device runtime 320, one or more software kernels such as software kernel 322, one or more runners such as runner 324, and an RDMA library 414. Each of device runtime 320, software kernel 322, runner 324, and RDMA library 414 is implemented as program code that may be stored in memory, e.g., RAM 316, and executed by device processor 306.

In the example of FIG. 4, substantially the same functionality as described in connection with FIG. 3 may be provided by HCS 100. That is, HCS 100 is capable of operating substantially as described in connection with FIG. 3. With host system 102 and IC 150 being communicatively linked by Ethernet communication channel 402, RDMA networking technology may be used to support communications using NIC 406 and NIC 412. Accordingly, in one or more example implementations, host runtime 304 and device runtime 320 may be RDMA aware. That is, host runtime 304 and device runtime 320 may have access to an RDMA API provided by RDMA library 404 and RDMA library 414, respectively. The RDMA APIs may be implemented using an RDMA library such as Libiverbs which enables user-space processes (e.g., host runtime 304 and device runtime 320) to use RDMA verbs. In the example of FIG. 4, RDMA data conveyance may be handled by the runtimes (e.g., host runtime 304 and device runtime 320) such that RDMA usage is transparent. That is, host application 318 and software kernel 322 may be unaware of any RDMA implementation or operational details.

In the case of an RDMA implementation, host system 102 maintains submission queue 408 and utilizes RDMA library 404 to migrate submission queue 408 on the remote system to hardware submission queue 308 IC 150. That is, using RDMA, the contents of submission queue 408 may be copied to hardware submission queue 308 and continually updated over time. Thus, the data, e.g., commands, of submission queue 408 appear in IC 150. IC 150 further includes a hardware completion queue 310. RDMA library 414 may be used to migrate hardware completion queue 310 to completion queue 410. Using RDMA, the contents of hardware completion queue 310 in IC 150 may be copied to completion queue 410 in host system 102 and continually updated over time. In using RDMA technology, IC 150 is capable of returning a completion status to host system 102 over communication channel 402 by way of NICs 412, 406. One aspect of the example of FIG. 4 is that multiple accelerators 104 may be used without having such accelerators 104 being located on the same PCIe bus.

Figure 5:
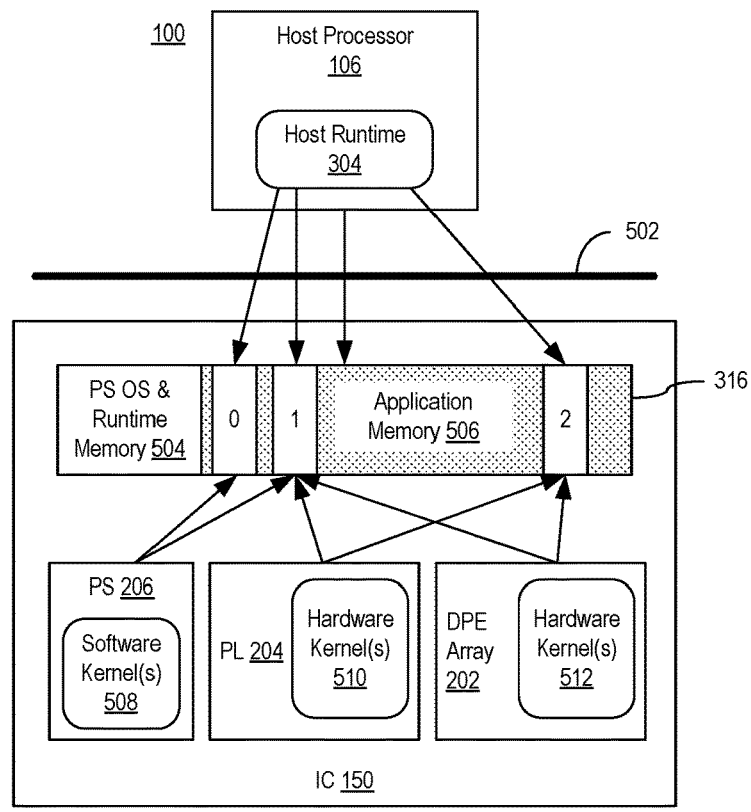
FIG. 5 illustrates another example implementation of an HCS in accordance with the inventive arrangements described herein.

FIG. 5 illustrates another example implementation of HCS 100 in accordance with the inventive arrangements described herein. The example of FIG. 5 illustrates an example memory layout for RAM 316. In the example, IC 150 is communicatively linked to host processor 106 via communication channel 502. Communication channel 502 may be implemented as described herein in connection with FIG. 3 and/or FIG. 4.

In the example, RAM 316 has a region 504 of memory that is reserved to store the operating system for PS 206 (e.g., for device processor 306) and a region 506 reserved as application memory. Region 504 is reserved for storing the operating system and device runtime 320 and may only be used by PS 206 (e.g., by device processor 306). Region 506, being reserved memory for applications, may be accessed by user kernels. In one aspect, host processor 106 is capable of reserving region 506 and allocating buffers therein for use by user kernels. The user kernels may include software kernels 508 executed by PS 206 and/or hardware kernels 510 implemented in PL 204, and/or hardware kernel(s) 512 implemented in DPE array 202.

FIG. 5 illustrates that through RAM 316, a software kernel 508 executed by PS 206 may access buffer 0 and 1, while a hardware kernel 510 implemented in PL 204 may access buffers 1 and 2. Thus, buffer 1 may be shared and accessed by both kernels. The software kernel 508 executed by PS 206 may access buffers 0 and 1 using virtual memory addresses mapped to the physical addresses by the device runtime (e.g., the runner for the software kernel), while hardware kernel 508 may access buffers 1 and 2 using physical addresses.

Similarly, a hardware kernel 512 implemented in DPE array 202 may access buffers 1 and 2. Thus, buffers 1 and 2 may be shared and accessed software kernel 508, hardware kernel 510, and hardware kernel 512. Hardware kernel 512 in DPE array 202 may access buffers 1 and 2 using physical addresses. In one or more other embodiments, certain hard-wired circuit blocks implementing kernels (not shown) may also access buffers such as buffers 0, 1, and/or 2.

Figure 6:
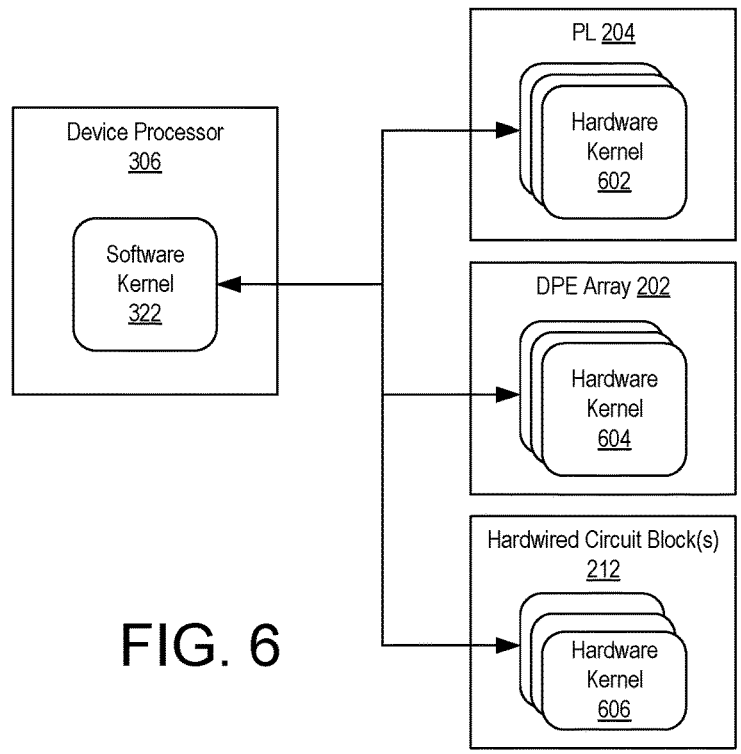
FIG. 6 illustrates another example implementation of the IC of the HCS of FIG. 1 where a software kernel is capable of invoking and controlling operation of one or more other kernels implemented in the IC.

FIG. 6 illustrates another example implementation of IC 150 where software kernel 322 is capable of invoking and controlling operation of one or more other kernels implemented in IC 150. The host processor 106 may request execution of software kernel 322 as described herein. Upon execution and using the API provided by device runtime 320, software kernel 322 may invoke hardware kernel(s) 602, hardware kernel(s) 604, and/or hardware kernels 606. In invoking the hardware kernels 602, 604, and/or 606, software kernel 322 may provide data to the respective hardware kernels by invoking data transfer functions from device runtime 320. Further, software kernel 322 may monitor operation of hardware kernels 602, 604, and/or 606 and determine when each hardware kernel completes execution. Software kernel 322, in response to determining that hardware kernel(s) 602, 604, and/or 606 have completed execution, may also complete execution.

Figure 7:
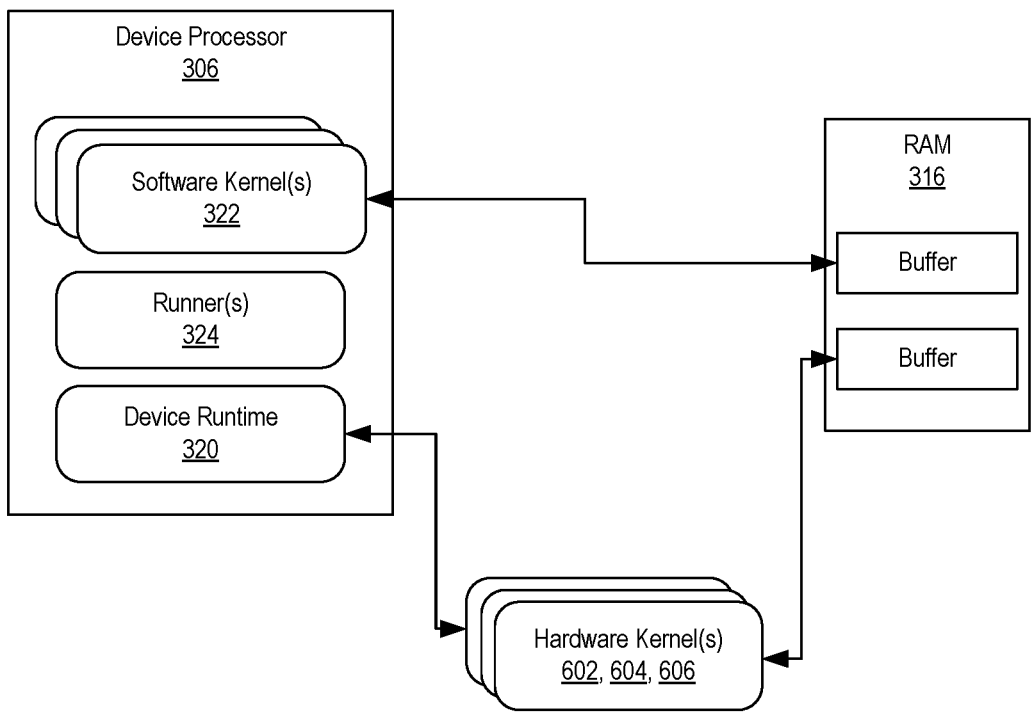
FIG. 7 illustrates another example implementation of the IC of the HCS of FIG. 1.

FIG. 7 illustrates another example implementation of IC 150. In the example of FIG. 7, software kernels 322, as executed by device processor 306, are capable of invoking one or more hardware kernels 602, 604, and/or 606 via the API provided by device runtime 320. Hardware kernels 602, 604, and/or 606 and software kernels 322 are capable of accessing buffers from RAM 316.

FIG. 8 is an example method 800 illustrating certain operative features of IC 150 in accordance with the inventive arrangements described herein. In the example, IC 150 may be booted with a shell configuration that loads the operating system therein for execution by device processor 306, loads runtime 320 therein, and performs any other configuration of the device that may be required to establish the communication link with host system 102. The shell configuration may include one or more kernels to be implemented in IC 150 including software kernel 322.

In one aspect, software kernel(s) and/or hardware kernel(s) may be dynamically downloaded from host system 102 to IC 150 over time (e.g., during runtime of HCS 100). For example, host system 102 may provide a container file such as an XCLBIN file. The container file may include configuration data, e.g., one or more image files included in a container file, to IC 150. IC 150 may extract the image files, which may include hardware kernels and/or software kernels for implementation therein. In this manner, host system 102 may dynamically provide kernels to IC 150 and have the kernels loaded into IC 150 over time. Kernels may be swapped into and out of IC 150 over time under control of host computer 102.

Accordingly, in block 802, device processor 306 of IC 150 executes device runtime 320. The device, e.g., IC 150, is communicatively linked to host system 102, which includes the host processor 106. In block 804, IC 150 receives within a hardware submission queue 308 of the device a command from the host processor 106. The command requests execution of a software kernel 322 and specifies a descriptor stored in a region of a memory, e.g., RAM 316, of the device that is shared with the host processor 106. In block 806, in response to receiving the command, the device runtime 320, as executed by the device processor 306, invokes runner 324. Runner 324 is the runner that is associated with software kernel 322.

In block 808, runner 324 is capable of mapping one or more physical addresses of the descriptor to a virtual memory address corresponding to the descriptor that is usable by software kernel 322. In block 810, runner 324 is capable of executing software kernel 322. Software kernel 322 is capable of accessing data specified by the descriptor using the virtual memory address as provided by runner 324.

In one aspect, the method includes initiating an interrupt from a completion doorbell circuit 314 of the device to the host processor 102 over a communication channel 302 in response to the software kernel 322 completing execution.

In another aspect, the method includes, in response to the software kernel 322 completing execution, writing, over an Ethernet communication channel 402 using a NIC 412, an indicator to a completion queue 410 disposed in host system 102. The indicator indicates that the software kernel 322 completed execution.

In another aspect, prior to receiving the command in the hardware submission queue 308, the runner 324 loads the software kernel 322 within a region of the RAM 316 allocated to the runner 324. For example, as part of the startup process, in executing runtime 320, a runner 324 may be invoked or executed for each of the software kernels available in IC 150. Each runner may execute in a different thread of device processor 306. Thus, there may be a one-to-one correspondence between software kernels and runners.

In another aspect, the mapping includes, in response to determining that a buffer specified by the descriptor is not stored locally in the memory shared with the host processor 102, retrieving the buffer to the memory shared with the host processor 102.

In another aspect, the mapping includes generating a call frame data structure including a mapped virtual memory address for each buffer pointer of the descriptor and including each scalar value of the descriptor. In cases where a buffer is remotely located and fetched and stored in the memory shared with the host processor (e.g., local memory of the device), the mapped virtual memory address for the buffer pointer is one corresponding to the location to which the buffer was copied in the memory shared with the host processor.

In another aspect, runner 324 may be confined to performing the mapping within the region of memory shared with the host processor 102. For example, runner 324 may only map virtual memory addresses to physical addresses that are located within the region of shared memory.

In another aspect, the software kernel is capable of controlling operation of one or more hardware kernels also implemented in the device.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   receiving, within a device, a command from a host processor, wherein the command requests execution of a software kernel of the device and specifies a descriptor stored in a region of a memory of the device shared with the host processor;
   wherein the device includes one or more subsystems that the host processor is restricted from directly accessing;
   mapping a physical address of the descriptor to a virtual memory address corresponding to the descriptor that is usable by the software kernel; and
   executing the software kernel, wherein the software kernel accesses data specified by the descriptor using the virtual memory address, and wherein the software kernel is configured to execute the command by invoking one or more hardware kernels of the device disposed in the one or more subsystems via a device runtime.

2. The method of claim 1, comprising:
   initiating an interrupt from a completion doorbell circuit of the device to the host processor over a communication channel in response to the software kernel completing execution.

3. The method of claim 1, comprising:
   in response to the software kernel completing execution, writing, over an Ethernet communication channel using a network interface controller, an indicator to a completion queue disposed in a host system, the indicator indicating that the software kernel completed execution.

4. The method of claim 1, further comprising:
   a runner program loading the software kernel within a region of the memory allocated to the runner program.

5. The method of claim 1, wherein the mapping includes, in response to determining that a buffer specified by the descriptor is not stored locally in the memory shared with the host processor, retrieving the buffer to the memory shared with the host processor.

6. The method of claim 1, wherein the software kernel is capable of invoking one or more other software kernels.

7. The method of claim 4, wherein the runner program is confined to performing the mapping within the region of memory shared with the host processor.

8. The method of claim 1, wherein the software kernel is capable of controlling a flow of data between the one or more hardware kernels.

9. A system, the comprising:
   a hardware submission queue configured to receive a command from a host processor, wherein the command specifies a software kernel and a descriptor stored in a region of a memory shared with the host processor;
   one or more subsystems that the host processor is restricted from directly accessing;
   a device processor configured to execute a device runtime; and
   a submission doorbell circuit configured to receive a notification of the command and, in response to the notification, generate an interrupt to the device processor;
   wherein the device runtime, as executed by the device processor, invokes a runner program in response to the interrupt, wherein the runner program is configured to map a physical address of the descriptor to a virtual memory address corresponding to the descriptor that is usable by the software kernel;
   wherein the runner program executes the software kernel and the software kernel accesses data specified by the descriptor using the virtual memory address as provided by the runner program; and wherein the software kernel is configured to execute the command by invoking one or more hardware kernels disposed in the one or more subsystems via the device runtime.

10. The system of claim 9, comprising:

a hardware completion queue configured to store pointers to results stored in the region of the memory shared with the host processor; and a completion doorbell circuit configured to generate interrupts to the host processor;

wherein the device processor, in response to the software kernel completing execution, causes the completion doorbell circuit to generate an interrupt to the host processor and store a pointer in the hardware completion queue, the pointer referencing a result generated by the software kernel.

11. The system of claim 9, wherein the host processor and the device processor communicate over a Peripheral Component Interconnect Express communication channel.

12. The system of claim 9, wherein the software kernel is capable of invoking one or more other software kernels.

13. The system of claim 9, wherein the runner program, in response to determining that a buffer specified by the descriptor is not stored locally in the memory shared with the host processor, retrieves the buffer to the memory shared with the host processor.

14. The system of claim 9, wherein the runner program is confined to mapping the physical address to the virtual memory address within the region of memory shared with the host processor.

15. The system of claim 9, wherein the software kernel is capable of controlling a flow of data between the one or more hardware kernels.

16. A system, comprising:

a hardware submission queue configured to receive a command from a host processor, wherein the command specifies a software kernel and a descriptor stored in a region of a memory shared with the host processor;

one or more subsystems that the host processor is restricted from directly accessing;

a device processor configured to execute a device runtime; and a network interface controller configured to receive the command from the host processor and store the command within the hardware submission queue;

wherein the descriptor is stored in the region of the memory shared with the host processor by the network interface controller using remote direct memory access;

wherein the device runtime, as executed by the device processor, invokes a runner program in response to detecting the command in the hardware submission queue, wherein the runner program is configured to map a physical address of the descriptor to a virtual memory address corresponding to the descriptor that is usable by the software kernel;

wherein the runner program executes the software kernel and the software kernel accesses data specified by the descriptor using the virtual memory address as provided by the runner program; and wherein the software kernel is configured to execute the command by invoking one or more hardware kernels disposed in the one or more subsystems via the device runtime.

17. The system of claim 16, wherein the host processor and the device processor communicate over an Ethernet connection.

18. The system of claim 16, wherein the software kernel is capable of invoking one or more other software kernels.

19. The system of claim 16, wherein the runner program, in response to determining that a buffer specified by the descriptor is not stored locally in the memory shared with the host processor, retrieves the buffer to the memory shared with the host processor.

20. The system of claim 16, wherein the software kernel is capable of controlling a flow of data between the one or more hardware kernels.

* * * * *